United States Patent
Nylander et al.

(10) Patent No.: US 9,264,982 B2
(45) Date of Patent: Feb. 16, 2016

(54) METHOD AND ARRANGEMENT IN A COMMUNICATIONS SYSTEM

(75) Inventors: Tomas Nylander, Värmdö (SE); Tomas Hedberg, Stockholm (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 479 days.

(21) Appl. No.: 13/516,786

(22) PCT Filed: Dec. 23, 2009

(86) PCT No.: PCT/SE2009/051501
§ 371 (c)(1),
(2), (4) Date: Jun. 18, 2012

(87) PCT Pub. No.: WO2011/078756
PCT Pub. Date: Jun. 30, 2011

(65) Prior Publication Data
US 2012/0269128 A1    Oct. 25, 2012

(51) Int. Cl.
*H04W 48/00* (2009.01)
*H04W 8/18* (2009.01)
*H04W 84/14* (2009.01)

(52) U.S. Cl.
CPC ............... *H04W 48/17* (2013.01); *H04W 8/18* (2013.01); *H04W 84/14* (2013.01)

(58) Field of Classification Search
CPC ............... H04W 48/20; H04W 36/08; H04W 36/14–36/32; H04W 84/005; H04W 48/17; H04W 8/18; H04W 84/14
USPC .................... 370/328, 331; 455/436, 437, 445
See application file for complete search history.

(56) References Cited

U.S. PATENT DOCUMENTS

| | | | | |
|---|---|---|---|---|
| 6,636,502 B1* | 10/2003 | Lager et al. | ................... | 370/352 |
| 6,973,313 B1* | 12/2005 | Sebastian | ...................... | 455/445 |
| 8,467,782 B1* | 6/2013 | Faccin | ........................ | 455/432.1 |
| 8,639,243 B2* | 1/2014 | Radulescu et al. | ............ | 455/434 |
| 2008/0101396 A1* | 5/2008 | Miyata | ........................... | 370/408 |
| 2008/0250142 A1* | 10/2008 | Magnusson et al. | ........... | 709/225 |
| 2009/0285179 A1* | 11/2009 | Jones et al. | ..................... | 370/331 |
| 2010/0272031 A1* | 10/2010 | Grayson et al. | ............... | 370/329 |
| 2011/0103310 A1* | 5/2011 | Stojanovski et al. | ......... | 370/328 |
| 2012/0178416 A1* | 7/2012 | Miklos et al. | ................. | 455/410 |
| 2012/0184294 A1* | 7/2012 | Stojanovski et al. | ...... | 455/456.1 |
| 2012/0208506 A1* | 8/2012 | Hirano et al. | .................. | 455/411 |

FOREIGN PATENT DOCUMENTS

EP      2079253 A1    7/2009
EP      2114036 A1    11/2009

* cited by examiner

*Primary Examiner* — Paul H Masur
*Assistant Examiner* — Kabir Jahangir
(74) *Attorney, Agent, or Firm* — Murphy, Bilak & Homiller, PLLC

(57) ABSTRACT

The present invention relates to a method and a network node for selecting a gateway for a user equipment in a communications system. The communications system comprises the network node and one or more gateways, configured to provide packet data network connectivity to the user equipment. The network node detects (401) the presence of local gateways among said gateways and obtains (403) a first set of information indicating the type of the user equipment. Based on the first set of information, the network node selects (406) one of the detected local gateways to provide packet data network connectivity to the user equipment when the user equipment type is of a fixed type.

20 Claims, 5 Drawing Sheets

METHOD AND ARRANGEMENT IN A COMMUNICATIONS SYSTEM

TECHNICAL FIELD

The present invention relates to a method and an arrangement in a network management node. In particular, it relates to selecting a gateway for a user equipment in a communications system.

BACKGROUND

Mobile Broadband (MBB) based on High Speed Packet Access/Long Term Evolution (HSPA/LTE) and other mobile communication standards has taken off as an important technology for connecting User Equipments (UEs) like e.g. mobile Personal Computers (PCs) to the Internet. As Mobile Broadband (MBB) takes off new types of equipment appears on the market such as Fixed Wireless Access (FWA) solutions. In addition, the usage of broadband wireless adaptors so called "dongles" and built-in MBB capabilities for PCs and laptops is increasing heavily.

FWA is about providing an end user such as user equipment or PC with fixed line services by utilizing a wireless technology, e.g. Global System for Mobile communications (GSM), Wideband Code Division Multiple Access (WCDMA), System Architecture Evolution/Long Term Evolution (SAE/LTE), Code Division Multiple Access (CDMA) or Worldwide Interoperability for Microwave Access (WiMAX) technologies. All FWA solutions comprise specific Fixed Wireless Terminals (FWT) that are also known as Mobile Broadband Routers (MBR). Fixed Wireless Terminals offer a cost efficient way to provide high speed data, voice and fax services to small office/home office and residential users. A FWT is a box that from the end user perspective can be compared with an Asymmetric Digital Subscriber Line (ADSL) modem. The FWT may also contain router functionality, Ethernet switch and WLAN functionality in order to give connectivity to several devices. However the FWT uses the mobile network (NW) for the backhaul and Internet connectivity instead of the fixed broadband.

To the mobile network, these devices, e.g. FWT and PCs with dongles appears as normal user equipments, even though they are more or less stationary and do not require the high degree of mobility a mobile network is designed for and provides. A dongle is a small piece of hardware that connects to a laptop or desktop computer. A dongle refers to a broadband wireless adaptor or in general to connectors that translate one type of port to another. Due to the increase number of FWT and PCs with dongles in the market, the data traffic generated by these equipments is increasing substantially in the mobile core network.

Almost all Wireless communications systems have data traffic access towards the public IP network via a few gateway nodes. For example in SAE/LTE system the gateway node is called Packet Data Network Gateway (PDN GW) and in a WCDMA system the gateway node is called Gateway GPRS Support Node (GGSN). This configuration means that all user traffic needs to be handled and transported via the mobile core network, which puts constraint on the gateway node capacity.

SUMMARY

It is therefore an object of the invention to provide a mechanism that reduces the user equipment data traffic in the mobile core network.

According to a first aspect of the invention, the object is achieved by a method in a network node for selecting a gateway for a user equipment in a communications system. The communications system comprises the network node and one or more gateways which gateways are configured to provide packet data network connectivity to the user equipment. The network node detects the presence of local gateways among said gateways. This is performed by receiving local gateway address information from a radio access node or information from a radio access node from which local gateways addresses are retrieved. The network node may also detect the presence of local gateways by detecting radio access network related information indicating the presence of local gateways, which network related information is stored in the network node. After detecting the presence of local gateways the network node obtains a first set of information indicating the type of the user equipment. This is performed by receiving at the network node information indicating the type of the user equipment as part of a user equipment data when a user equipment context is created, or as part of an control signalling from the user equipment. The information indicating the user equipment type may also be obtained from a storing unit within the network node. After obtaining a first set of information indicating the type of the user equipment, the network node selects, based on the first set of information, one of the detected local gateways to provide packet data network connectivity to the user equipment when the user equipment type is of a fixed type. The network node may further select, based on the obtained information, a non-local gateway among said gateways to provide packet data network connectivity to the user equipment when the user equipment type is of a mobile type. The local gateways are located in a radio access network. Furthermore the network node may also obtain information indicating the capability of each of the local gateways and selects, based further on the obtained information indicating the capability of each of the local gateways, one of the detected gateways to provide packet data network connectivity to the user equipment when the user equipment type is of a fixed type or mobile.

According to a second aspect of the invention, the object is achieved by a network node within a communications system. The communications system comprises one or more gateways configured to provide packet data network connectivity to user equipments. The network node is configured to select a gateway for a user equipment. The network node comprises a detecting circuit configured to detect the presence of local gateways among said gateways. The detecting circuit further is configured to receive, from a radio access network node, address information for local gateways or information from which local gateways addresses are retrieved. The detecting circuit further is configured to detect radio access network related information indicating the presence of local gateways, which network related information is stored in the network node. The network node further comprises an obtaining circuit configured to obtain a first set of information indicating the type of the user equipment. The information indicating the type of the user equipment is received at the network node as part user equipment data when a user equipment context is created or as part of an attach message from the user equipment. The network node further comprises a storing unit. The obtaining unit is further configured to obtain the user equipment type information from the storing unit. The network further comprises a selecting circuit configured to select, based on the obtained information, one of the detected local gateways to provide packet data network connectivity to the user equipment when the user equipment type is of a fixed type or a non-local gateway when the user equipment type is of a mobile type. The local gateways are located in a radio access network. The obtaining circuit is further configured to obtain information indicating the capability of each of the local gateways and wherein the selecting circuit is further configured to select a gateway based on the obtained information indicating the capability of each of the local gateways.

Since the network node selects, for user equipments of fixed type, a local gateway to access the internet, the user equipment data traffic in the mobile core network is reduced.

An advantage according to one embodiment of the invention is that it enables local breakout of internet user data at a local GW for a specific type of the user equipments, i.e. it allows user data not to be routed through the core network for these user equipments, hence reducing the transport cost.

A further advantage according to another embodiment of the invention is that it the load may be distributed more homogeneously across the detected gateways. Also, when a choice of gateways exists some level of service can be maintained even in case of a failing gateway.

A further advantage according to another embodiment of the invention is that a network can be extended with gateways without requiring extensive operation and maintenance tasks in the core network since the presence of such gateways can be dynamically signalled.

BRIEF DESCRIPTION OF THE DRAWINGS

The invention is described in more detail with reference to attached drawings illustrating exemplary embodiments of the invention and in which.

DETAILED DESCRIPTION

Figure 1:
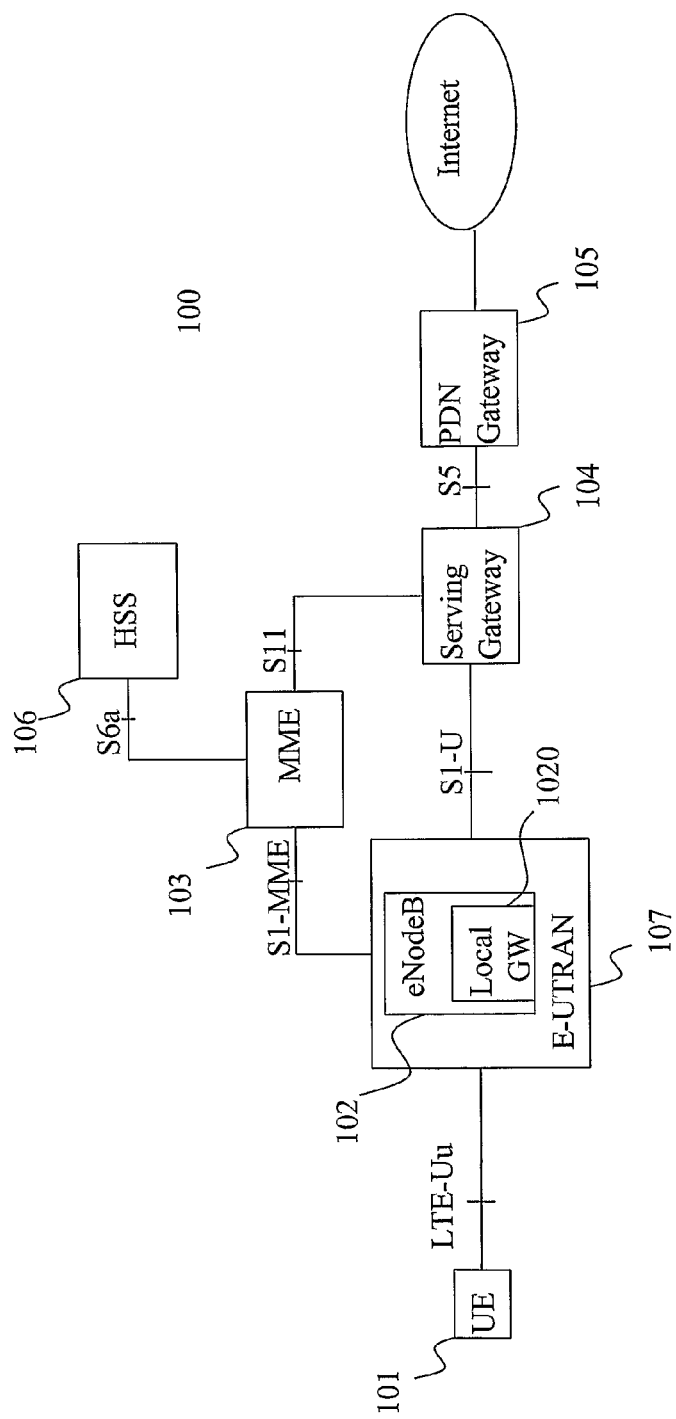
FIG. 1 is a is a schematic block diagram illustrating embodiments of a wireless communication network.

FIG. 1 depicts a communications system 100 wherein the invention may be implemented. The communications system 100 uses SAE/LTE technology to provide backhaul connection. However other technologies may be used such as e.g. WCDMA depicted in FIG. 2, GSM/Enhanced Data Rates for GSM Evolution (EDGE) or WiMAX.

The communications system 100 using SAE/LTE technology further comprises a User Equipment (UE) 101, an Evolved UMTS Terrestrial Radio Access Network (E-UTRAN) 107, a Mobility Management Entity (MME) 103, a Serving Gateway (S-GW) 104, Packet Data Network Gateway (PDN GW) 105 and a Home subscriber server (HSS) 106. Even though FIG. 1 indicates S-GW 104 and PDN GW 105 as separate entities, they may be combined in a single entity.

The E-UTRAN 107 is a radio access network that interfaces to both the user equipment 101 and the core network. The E-UTRAN 107 may comprise a single node, the eNodeB (eNB) 102 that comprises a transmitter and a receiver to communicate with the user equipment (UE) 101. In accordance with one embodiment of the invention the eNodeB 102 may also comprise a local Gateway (Local GW) 1020 which may provide access towards the Internet. The Local GW 1020 may also be located nearby the eNodeB 102.

The MME 103 is the key control-node for the LTE radio access network. It is involved in the bearer activation/deactivation process and is also responsible for choosing the S-GW 104 for a user equipment 101 at the initial attach and at time of intra-LTE handover involving Core Network (CN) node relocation.

The S-GW 104 routes and forwards user data packets, while also acting as the mobility anchor for the user plane during inter-eNB handovers and as the anchor for mobility between LTE and other 3GPP technologies. The user plane is the functions that deal with issues of user-to-user information transfer and associated controls. The S-GW 104 manages and stores user equipment contexts, e.g. parameters of the IP bearer service, network internal routing information.

The PDN GW 105 provides connectivity to the user equipment 101 to external packet data networks by being the point of exit and entry of traffic for the user equipment 101. A UE 101 may have simultaneous connectivity with more than one PDN GW for accessing multiple PDNs. The PDN GW 105 performs policy enforcement, packet filtering for each user, charging support, lawful Interception and packet screening. Another key role of the PDN GW is to act as the anchor for mobility between 3GPP and non-3GPP technologies such as WiMAX and 3GPP2 (CDMA 1X and EvDO).

The HSS 106 manages the subscriber information and location information of the user equipment 101.

Figure 2:
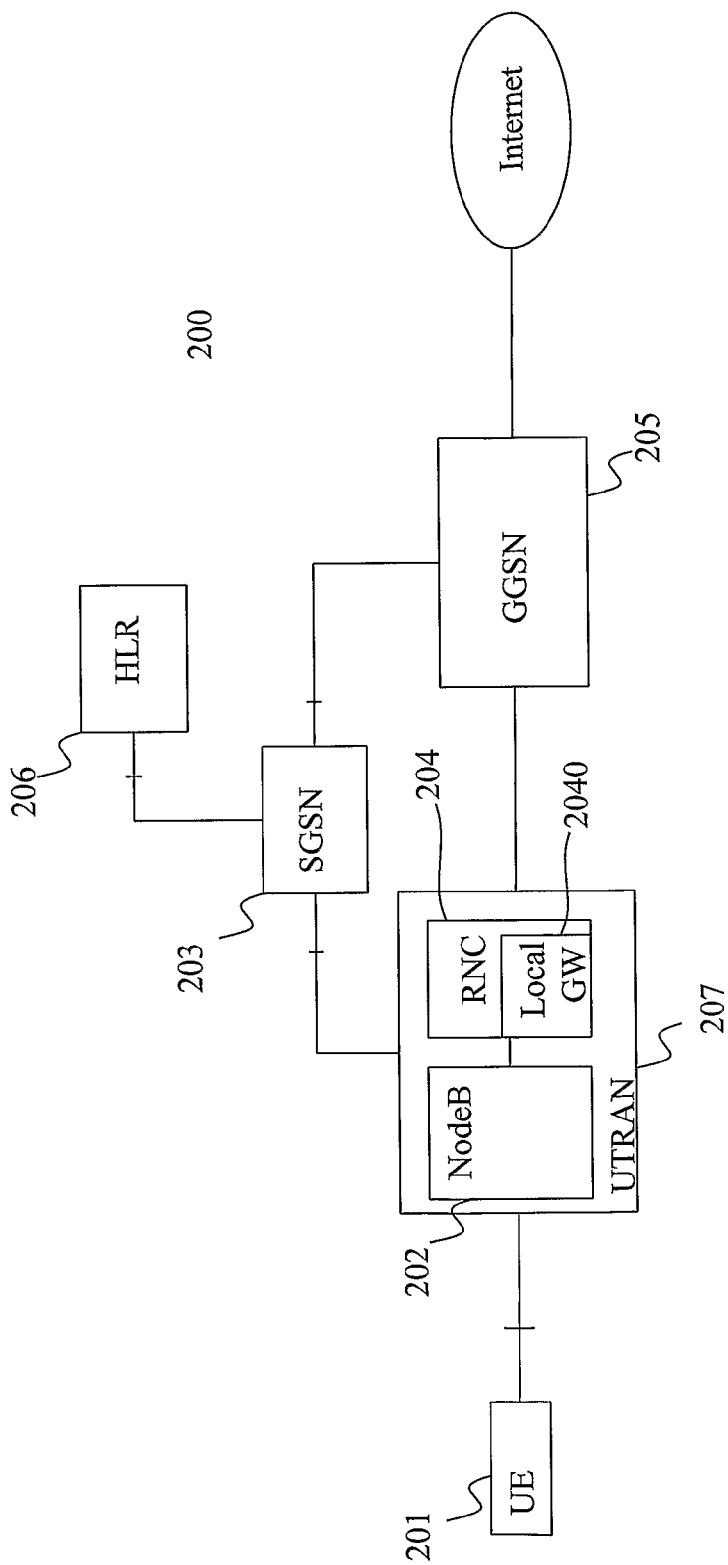
FIG. 2 is a is a schematic block diagram illustrating embodiments of a wireless communication network.

The above mentioned entities may incorporate further functions according to the supported service FIG. 2 depicts a communications system 200 wherein the invention may be implemented. The communications system 200 uses WCDMA technology to provide backhaul connection. The communications system further comprises a User Equipment (UE) 201, an UMTS Terrestrial Radio Access Network (UTRAN) 207, a Serving GPRS Support Node (SGSN) 203, a Gateway GPRS Support Node (GGSN) 205 and a Home Location Register (HLR) 206.

The UTRAN 207 is a radio access network that interfaces to both the user equipment 201 and the core network. The UTRAN 207 comprises two main radio access nodes, a NodeB 202 and a Radio Network Controller (RNC) 204. The NodeB 202 comprises a transmitter and a receiver to communicate with the user equipment 101. The RNC 204 controls the Node Bs that are connected to it and undertakes the radio resource management and some of the mobility management functions. In accordance with one embodiment of the invention the RNC 204 may also comprise a local gateway 2040 providing access towards the Internet. In case of flat architecture, i.e. a combined NodeB 202 and RNC 204, not shown, the combined NodeB 202 and RNC 204 may also comprise a local gateway 2040. The Local GW 2040 may also be located nearby the RNC 204 or nearby the combined NodeB 202 and RNC 204 in case of flat architecture.

The SGSN 203 is responsible for the delivery of data packets from and to the mobile stations within its geographical service area i.e. between the GGSN 205 and the RNC 204 in a WCDMA network with traditional architecture and if direct tunnel between the RNC 204 and the GGSN 205 is not applied. Its tasks include packet routing and transfer, mobility management (attach/detach and location management), logical link management, and authentication and charging functions. The SGSN 203 is also responsible for selecting GGSN 205 for a user equipment 201. In case direct tunnel is used, data packets are sent between the RNC 204 and GGSN 205 bypassing the SGSN 203.

The GGSN 205 handles inter-working between the UMTS packet switched network and external packet switched network likes the internet. The GGSN 205 routes and forwards user data packets, while also acting as the mobility anchor for the user plane during inter-NodeB handovers and as the anchor for mobility between WCDMA and other 3GPP technologies.

The HLR 206 manages the subscriber information and location information of the user equipment 201 and having the same functionality as the HSS 106.

The above mentioned entities may incorporate further functions according to the supported service In WCDMA systems as well as in SAE/LTE system, the mobile network provides Internet connectivity from the GGSN 205 and the PDN GW 105 respectively. Every session of the user equipment 101 may be anchored at the GGSN 105 in WCDMA systems or at the PDN GW 105 in SAE/LTE systems for the sake of mobility. The fact that every session passes through the GGSN 205 or the PDN GW 105, increases the load on the mobile core network.

Referring to both FIG. 1 and FIG. 2, the User Equipment 101, 201 which for example may be a Fixed Wireless Terminal (FWT) or a PC with a dongle or any similar equipment, appears as a normal user equipment towards the mobile network, even though they are more or less stationary and do not require the high degree of mobility that the mobile network is designed for and provides.

Figure 3:
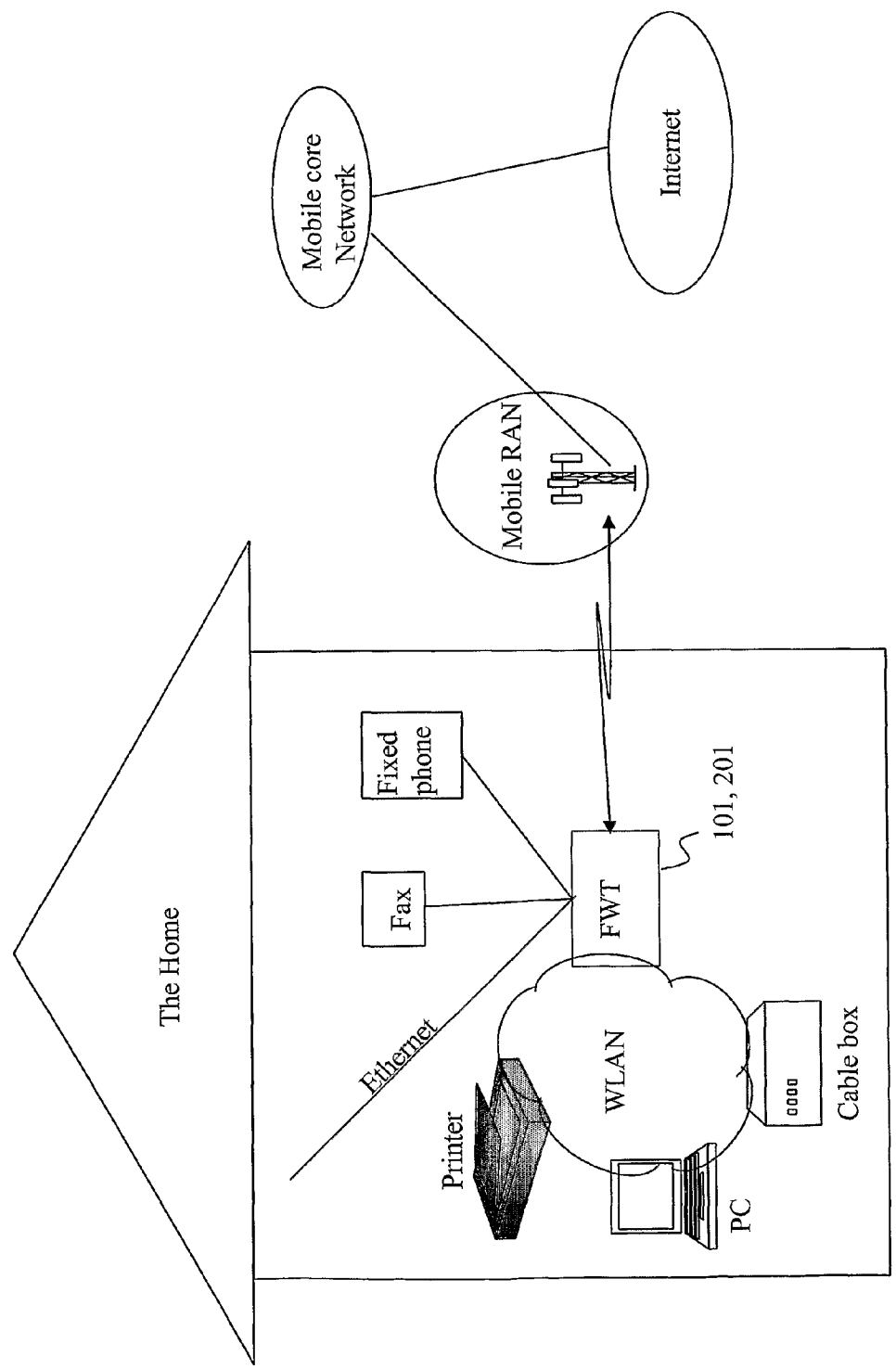
FIG. 3 is a is a schematic block diagram illustrating embodiments of a wireless communication network.

Referring to FIG. 3, The FWT device 101, 201 is also known as Mobile Broadband Routers (MBR). The FWT device 101, 201 is for example located in an end user's home, normally in the same location all the time i.e. there is no real mobility related to the FWT except "nomadicity" i.e. that the FWT 101, 201 could be powered off in one place, moved to another location and then powered on again. The FWT 101, 201 provides local connectivity and services for end user equipment located in the home using for example wireless local access network WLAN/WiFi or Ethernet as the media. In addition, the FWT 101, 201 may provide support for multiple legacy services. For example fixed phone or fax can be connected to the FWT 101, 201. The FWT 101, 201 may then be directly connected to the mobile operator's radio access and core network and may for example provide access towards the Internet.

Figure 4:
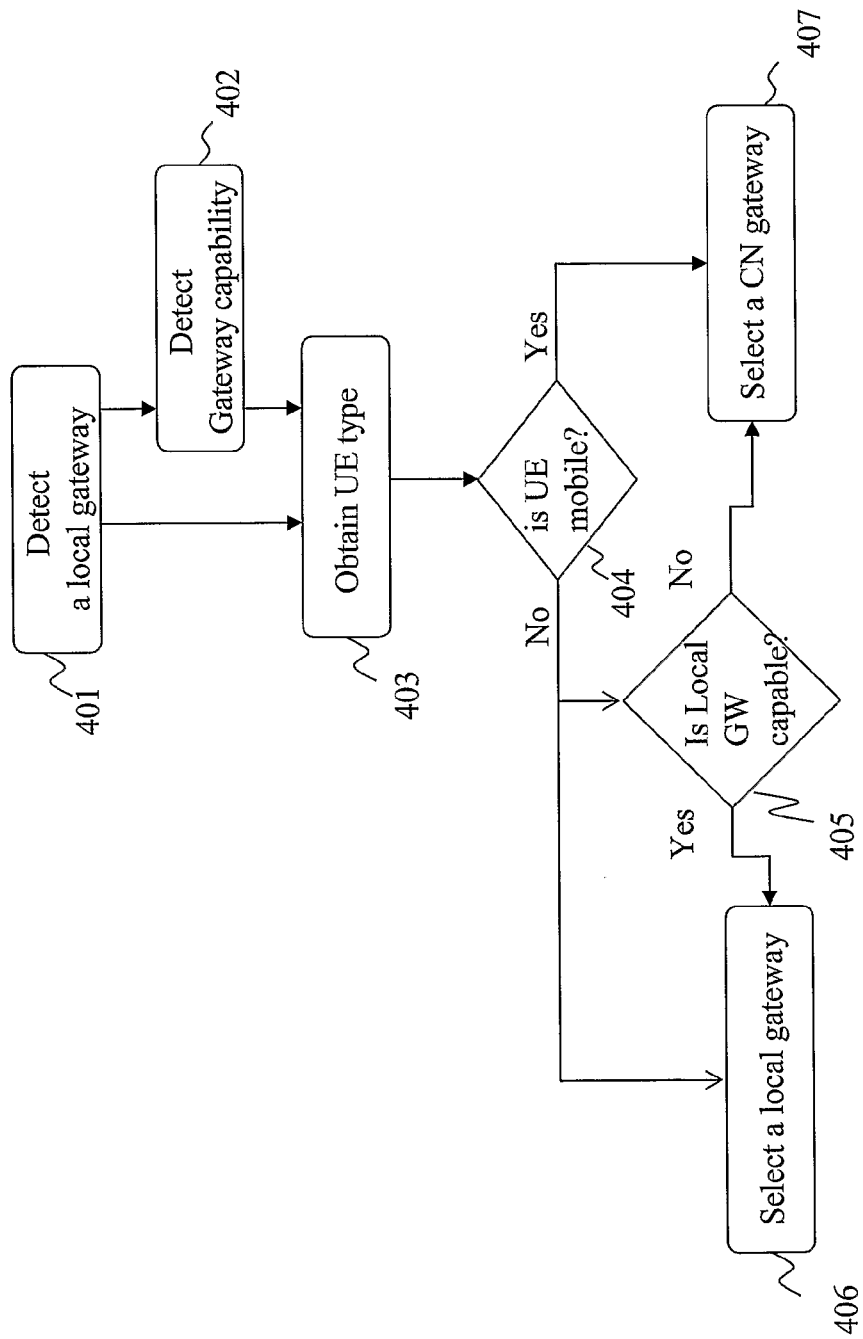
FIG. 4 is a flowchart depicting embodiments of a method in a network node.

The present solution method in a network node 101, 203 for selecting a gateway to a user equipment in a communications system 100, according to some embodiments will now be described with reference to the flowchart depicted in FIG. 4. The network node 103, 203 may when used in LTE/SAE system be an MME 103, or when used in WCDMA system be a SGSN 203. The network node 103, 203 may also be any other appropriate node being able to perform gateway selections, such as the S-GW 104. The method comprises the following steps, which steps may as well be carried out in another suitable order than described below:

Step 401

The network node 103, 203 detects the presence of local gateways 1020, 2040. In some of the embodiments this may be performed by receiving address information for the local gateways from a radio access node 102, 202, 204.

In LTE/SAE system related embodiments, this step may be performed by the network node 103, i.e. the MME, by receiving from the radio access node 102, an S1 SETUP REQUEST message indicating the presence of a local gateway 1020. The S1 SETUP REQUEST message is sent from the radio access node, e.g. an eNB 102, when the radio access node is taken into service to establish a communication path to the core network nodes, e.g. MMEs. The network node 103 may also receive in a control signalling message from the radio access node 102 indicating the presence of a local gateway 1020 when the user equipment 101 attaches or activates a session. For example, the control signalling message may be extended to carry information about the presence of the local gateway 1020 such as the identity of the local gateway 1020.

In WCDMA system related embodiments, this step may be performed by the network node 203, i.e. the SGSN, receiving from the radio access node 202, 204 which may either be the combined NodeB 202 and RNC 204 in case of flat architecture or the RNC 204, an Iu message indicating the presence of a local gateway 2040. An example of an Iu message is INITIAL UE MESSAGE which may for example encapsulate ATTACH REQUEST or ROUTING AREA UPDATE. The Iu is the interface that links the RNC with the core network. The network node 203 may also receive information indicating the presence of a local gateway 2040 at every user equipment 201 initial access. This indication may be dependent on the capacity constraint of the local gateway 2040, for example if the local gateway have a shortage of resources, such as IP addresses or processing capacity etc., to handle local connectivity, it may refrain from sending the indication about presence of local gateway to the SGSN. In case of a flat architecture, i.e. a combined NodeB and RNC, the network node may also receive information indicating the presence of a local gateway from logical functionality of the combined node.

In some of the embodiments this step of detecting the presence of local gateways may also be performed by receiving information from a radio access node 102, 202, 204 from which local gateways addresses are retrieved. The received information may for example be used towards a local configuration table, stored at the network node 103, 203 or towards a Domain Name System (DNS) to retrieve address information of the local gateways 1020, 2040.

In some of the embodiments, this step is performed by the network node 102, 203 which may detect the presence of the local gateways 1020, 2040 by being configured to comprise RAN related information indicating the presence of one or more local gateways 1020, 2040. This information may for example be an identity of the RNC (RNC-ID) or Service Area identification (SAI) in WCDMA system or an identity of the eNodeB (eNB-ID) or Evolved-Cell Global identification (E-CGI) in LTE/SAE system.

In some of the embodiments, when detecting the presence of the local gateways 1020, 2040, the network node 103, 203 may for example be configured to use a Domain Name System (DNS) to resolve a constructed Fully Qualified Domain Name (FQDN) to obtain the IP address of the local gateway in the RAN.

In some of the embodiments, the local gateways 1020, 2040 may be located in any node within the RAN of a communication system. In SAE/LTE system the local gateway 1020 may be located in a eNodeB 102, a home base station such as a HeNB, a concentrator node for home base stations such as a HeNB GW, in any other node within the RAN or as a separate node within the RAN. In WCDMA system the local gateways 2040 may be located in a RNC 204, a NodeB 202 in case of a flat architecture, a home base station such as a HNB, a concentrator node for home base stations such as a HNB GW, in any other node within the RAN or as a separate node within the RAN.

In some of the embodiments wherein the local gateway 2040 is located in or nearby the RNC 204, this step may be performed by the network node 103, 203 which may detect the presence of the local gateway 2040 by being configured to comprise a special FQDN Which may be built based on the above information, for example when RNC-ID is used the FQDN would be:

localgw.RNC-IDxxxx.MNCyy.MCCzz.operator.com.

Then a normal DNS query may be performed to resolve the IP-address of the local gateway 2040 for a specific RNC.

Step 402

This is an optional step. The network node 103, 203 may obtain information from the radio access node 102, 202, 204 indicating the capability of the local gateway 1020, 2040. This information may be obtained by being signalled from the radio access node 102, 202, 204 in the form of services or Access Point Names (APNs) supported in the local gateway 1020, 2040. These APNs may indirectly be used to indicate "local gateway capabilities". Generally the APN identifies an IP packet data network (PDN) that a user equipment 101, 201 wants to communicate with. In addition to identifying a PDN, an APN may also be used to define the type of service, for example connection Wireless Application protocol (WAP) server, multimedia messaging service (MMS), that the UE 101, 201 wish to use.

Step 403

The network node 103, 203 obtains information indicating the type of the user equipment 101, 201. This may be performed to convey information to gateway selection function in the network about user equipments that do not require mobility, i.e. a user equipment of a fixed type. By a user equipment being a fixed type is meant a user equipment of a more stationary type or of a non mobile type such as e.g. a FWT.

In some of the embodiments, the information indicating the type of the user equipment 101, 201 is statically added to the HSS/HLR data for a user equipment 101, 201 (e.g. for a subscription) and this information indicates 'type of terminal/subscription' and is sent to the network node 103, 203 as part of other user data when a user equipment context is created in the network node 103, 203.

In some of the embodiments the information indicating the type of the user equipment 101, 201 is transmitted from the user equipment to the network node 103, 203 as part of the user equipment capabilities or similar signalling, for example during attach.

In some of the embodiments the information indicating the type of the user equipment is transmitted to the network node 103, 203 as part of a special Access Point Name (APN) and this APN is indirectly used to indicate "type of terminal".

In some of the embodiments the network node 103, 203 obtains the information by being configured with information indicating the type of the user equipment 101, 201 as a non mobile user equipment or a fixed user equipment. This may for example be special International Mobile Subscriber Identity (IMSI) ranges used for PC dongles or FWT devices, International Mobile Equipment Identity (IMEI) or International Mobile Equipment Identity and software version number (IMEI-SV).

Step 404

This step is a conditional step and may be implicitly used by the network node 103, 203. When the obtained information in step 403 indicates that the user equipment type is mobile the network node 103, 203 may perform method step 406 as will be described below. When the obtained information in step 403 indicates that the user equipment type is fixed, the network node 103, 203 may perform method step 405 as will be described further below.

Step 405

This an optional step and may be implicitly used by the network node 103, 203. Based not only on the obtained information in step 402 but also on the obtained information in the optional step 403 indicating the capabilities of the detected local gateways 1020, 2040, the network node 103, 203 may perform method steps 406 and 407 as will be described below. When the obtained information in step 402 indicates that the user equipment is of type fixed, and the obtained information in step 403 indicates that the detected local gateway 1020, 2040 has the capability the carry out the requested services that may be provided locally, e.g. plain Internet access, the network node may perform step 406. When the obtained information in step 402 indicates that the user equipment is of type fixed and the obtained information in step 403 indicates that the detected one or more local gateways 1020, 2040 for example do not have the capability the carry out the requested services, or do not fulfil the quality of service (QoS) requirement to provide packet data network connectivity to the user equipment 101, 201, the network 103, 203 node may perform step 407.

Step 406

The network node 103, 203 selects, based on the obtained information, one of the detected local gateways 1020, 2040 to provide packet data network connectivity to the user equipment when the user equipment type is fixed or non mobile.

In some of the embodiments, this step may be performed by receiving a request to establish a session, e.g. a PDP context activation request in WCDMA or an Attach Request in LTE/SAE. The network node 103, 203 may select, based on the obtained user equipment type, a local gateway 1020, 2040 for providing connectivity to the user equipment 101 to external packet data networks by being the point of exit and entry of traffic for the user equipment.

When the obtained information indicates fixed user equipment or non-mobile user equipment, the network node may select a one of the detected local gateways 1020, 2040 in step 401 that does not necessarily provide mobility. For example the selected local gateway may be comprised in the serving eNodeB or the serving RNC.

In some of the embodiments and after selecting a local gateway 1020, 2040, the network node 13, 203 may inform the RAN about this selection by signalling different associated data, e.g. IP address for data. Further the network node 103, 203 may inform the RAN that a local gateway 1020, 2040 shall be used and may provide needed configuration information, such as Downlink Traffic Flow Template (DL TFT).

Step 407

The network node 103, 203 selects, based on the obtained information in step 403, a non-local gateway 104, 105, 205 among said gateways to provide packet data network connectivity to the user equipment when the user equipment type is mobile.

In LTE/SAE system related embodiment, the mobile network 103, 203 may provide Internet connectivity from the non-local gateway 105 so called the PDN GW. The network node 103, 203 may select a non-local gateway 105 i.e. a PDN GW based on either data configured for the user equipment 101, 201 in the HSS 106 or based on an APN received from the user equipment 101, 201 at establishment of the connection, wherein the APN is then 'mapped' to a PDN GW.

In WCDMA system related embodiments, the mobile network may provide Internet connectivity from a non-local gateway 205 e.g. Gateway GPRS Support Node (GGSN). Normally only a few of these nodes exists in a mobile network, which node a user equipment will use may be selected by the network node 103, 203, in accordance with the WCDMA system specifications, when a connection is established.

When the network node 103, 203 selects a non-local gateway 104, 105, 205, the network node 103, 203 may inform the RAN about this selection by signalling different associated data, e.g. IP address for data.

Figure 5:
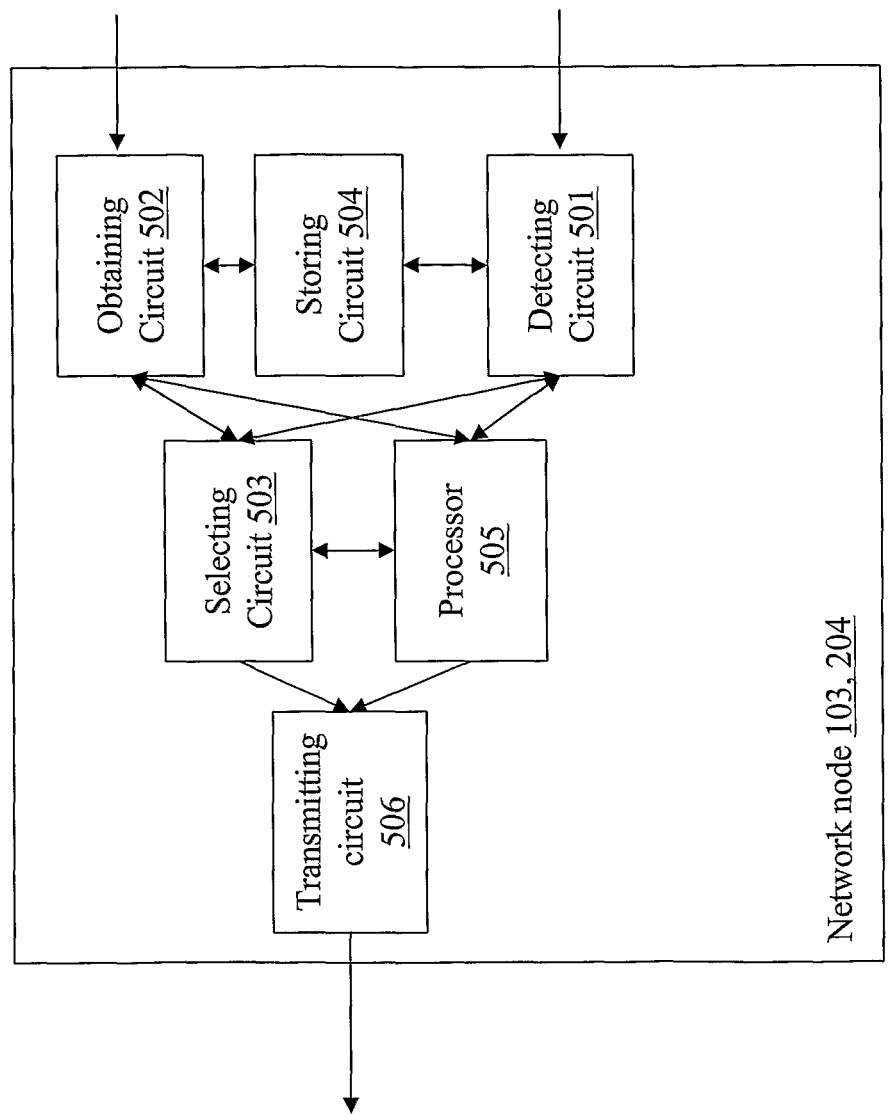
FIG. 5 is a schematic block diagram illustrating embodiments of a network node

To perform the method steps above for selecting a gateway to a user equipment in a communications system 100, 200, the network node 103, 203 comprises an arrangement depicted in FIG. 5. As mentioned above, the network node 103, 203 is comprised within a communications system 100, 203. The communications system 100, 203 comprises one or more gateways 1020, 104, 105, 2040, 205. The gateways 1020, 104, 105, 2040, 205 are configured to provide packet data network connectivity to user equipments.

The network node 103, 203 comprises a detecting circuit 501 configured to detect the presence of local gateways 1020, 2040, among said gateways 1020, 104, 105, 2040, 205. In some of the embodiments the detecting unit 501 is further configured to receive, from a radio access network node 102, 202, 204, address information for local gateways 1020, 2040 or alternatively information from which local gateway addresses are retrieved.

In some of the embodiments the detecting circuit 501 is further configured to detect the presence of local gateway 1020, 2040 based on radio access network related information configured in the network node 103, 203 or stored in a storing unit 504 within the node network 103,203.

The network node 103, 203 further comprises an obtaining circuit 502 configured to obtain a first set of information indicating the type of the user equipment 101, 201. In some of the embodiments the obtaining circuit 502 is configured to receive the information indicating the type of the user equipment 101, 201 as part of user equipment data when a user equipment context is created or as part of an attach message from the user equipment 101,201.

In some of the embodiments the obtaining circuit 502 is further configured to obtain information indicating the type of the user equipment 101, 201 from the storing unit 504 within the node network 103,203.

The network node 103, 203 further comprises a selecting circuit 503 configured to select, based on the obtained information, one of the detected local gateways 1020, 104, 2040 to provide packet data network connectivity to the user equipment 103, 203 when the user equipment type is of a fixed type. In some of the embodiments the selecting circuit 503 is further configured to select based on the obtained information, a non-local gateway 104, 105, 205 among said gateways 1020, 104, 105, 2040, 205 to provide packet data network connectivity to the user equipment 101, 201 when the user equipment type is of a mobile type.

In some of the embodiments the obtaining circuit 502 is further configured to obtain information indicating the capability of each of the local gateways 1020, 2040 and wherein the selecting circuit 503 is further configured to selects a local gateway 1020, 2040 based on the obtained information indicating the capability of each of the local gateways 1020, 2040.

In some of the embodiments the network node may also comprises a transmitter circuit 506. When the network node 103, 203 selects a non-local gateway 104, 105, 205 or a local gateway 1020, 2040, the network node 103, 203 may inform the RAN about this choice by signalling, via the transmitter circuit 506 different associated data, e.g. IP address for data. In case the selected gateway is a local gateway 1020, 2040 managed by the RAN the network node 103, 203 may inform the RAN that a local gateway 1020, 2040 will be used, and may provide needed configuration information, such as Downlink Traffic Flow Template (DL TFT).

The present mechanism for selecting a gateway to a user equipment 101, 201 in a communications system 100 may be implemented through one or more processors, such as a processor 505 in the network node 103, 203 depicted in FIG. 5, together with computer program code for performing the functions of the present solution. The program code mentioned above may also be provided as a computer program product, for instance in the form of a data carrier carrying computer program code for performing the present solution when being loaded into the network node 103, 203. One such carrier may be in the form of a CD ROM disc. It is however feasible with other data carriers such as a memory stick. The computer program code can furthermore be provided as pure program code on a server and downloaded to the network node 103, 203 remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for selecting gateways for user equipments in a communications system, the communications system comprising the network node and a plurality of gateways, which gateways are configured to provide packet data network connectivity to the user equipments, the method comprising:
    detecting the presence of local gateways among said gateways;
    obtaining a first set of information indicating a type of a first user equipment; and
    selecting, based on the first set of information, one of the detected local gateways to provide packet data network connectivity to the first user equipment, responsive to the first set of information indicating that the first user equipment type is of a fixed type.

2. The method of claim 1, further comprising:
    obtaining a second set of information indicating a type of a second user equipment; and
    selecting, based on the second set of information, a non-local gateway among said gateways, to provide packet data network connectivity to the second user equipment, responsive to the second set of information indicating that the second user equipment type is of a mobile type.

3. The method of claim 1, wherein the local gateways are located in a radio access network.

4. The method of claim 3, wherein said detecting is performed by receiving address information for the local gateways from a radio access node.

5. The method of claim 3, wherein said detecting is performed by receiving information from a radio access node, from which local gateways addresses are retrieved.

6. The method of claim 3, wherein said detecting comprises detecting radio access network related information indicating the presence of local gateways, which network related information is stored in the network node.

7. The method of claim 1, wherein the information indicating the first user equipment type is received at the network node as part of a user equipment data when a user equipment context is created.

8. The method of claim 1, wherein the first user equipment type is received at the network node as part of an attach message from the first user equipment.

9. The method of claim 1, wherein said obtaining the first set of information further comprises obtaining the first user equipment type information from a storing unit within the network node.

10. The method of claim 1, wherein the method further comprises obtaining information indicating the capability of each of the local gateways, and wherein said selecting is further based on the obtained information indicating the capability of each of the local gateways.

11. A network node for selecting gateways for user equipments in a communications system, which communications system comprises a plurality of gateways, the gateways being configured to provide packet data network connectivity to the user equipments, the network node comprising:
- a detecting circuit configured to detect the presence of local gateways among said gateways;
- an obtaining circuit configured to obtain a first set of information indicating a type of a first user equipment; and
- a selecting circuit configured to select, based on the obtained first set of information, one of the detected local gateways to provide packet data network connectivity to the first user equipment responsive to the first set of information indicating that the first user equipment type is of a fixed type.

12. The network node of claim 11, wherein the obtaining circuit is further configured to obtain a second set of information indicating a type of a second user equipment, and the selecting circuit is further configured to select, based on the obtained second set of information, a non-local gateway among said gateways, to provide packet data network connectivity to the second user equipment responsive to the second set of information indicating that the second user equipment type is of a mobile type.

13. The network node of claim 11, wherein the local gateways are located in a radio access network.

14. The network node of claim 13, wherein the detecting circuit further is configured to receive, from a radio access network node, address information for local gateways.

15. The network node of claim 13, wherein the detecting circuit further is configured to receive information from a radio access network node from which local gateways addresses are retrieved.

16. The network node of claim 13, wherein the detecting circuit further is configured to detect radio access network related information indicating the presence of local gateways, which network related information is stored in the network node.

17. The network node of claim 11, wherein the information indicating the type of the first user equipment is received at the network node as part of user equipment data when a user equipment context is created.

18. The network node of claim 11, wherein the information indicating the type of the first user equipment is received at the network node as part of an attach message from the user equipment.

19. The network node of claim 11, further comprising a storing unit, wherein the obtaining unit further is configured to obtain the first user equipment type information from the storing unit.

20. The network node of claim 11, wherein the obtaining circuit is further configured to obtain information indicating the capability of each of the local gateways and wherein the selecting circuit is further configured to select a gateway based on the obtained information indicating the capability of each of the local gateways.

* * * * *

UNITED STATES PATENT AND TRADEMARK OFFICE
CERTIFICATE OF CORRECTION

PATENT NO. : 9,264,982 B2  Page 1 of 1
APPLICATION NO. : 13/516786
DATED : February 16, 2016
INVENTOR(S) : Nylander et al.

It is certified that error appears in the above-identified patent and that said Letters Patent is hereby corrected as shown below:

In the specification,

Column 2, Line 20, delete "of an" and insert -- of a --, therefor.

Column 3, Line 33, delete "is a is a" and insert -- is a --, therefor.

Column 3, Line 35, delete "is a is a" and insert -- is a --, therefor.

Column 3, Line 37, delete "is a is a" and insert -- is a --, therefor.

Column 3, Line 42, delete "node" and insert -- node. --, therefor.

Column 4, Line 31, delete "service" and insert -- service. --, therefor.

Column 5, Line 12, delete "service" and insert -- service. --, therefor.

Column 5, Line 16, delete "GGSN 105" and insert -- GGSN 205 --, therefor.

Column 5, Line 44, delete "node 101, 203" and insert -- node 103, 203 --, therefor.

Column 6, Line 55, delete "in a" and insert -- in an --, therefor.

Column 7, Line 66, delete "an" and insert -- is an --, therefor.

Column 9, Line 9, delete "system 100, 203." and insert -- system 100, 200. --, therefor.

Column 9, Line 10, delete "system 100, 203" and insert -- system 100, 200 --, therefor.

Column 9, Line 27, delete "unit 504" and insert -- circuit 504 --, therefor.

Column 9, Line 38, delete "unit 504" and insert -- circuit 504 --, therefor.

Column 9, Lines 43-44, delete "equipment 103, 203" and insert -- equipment 101, 201 --, therefor.

Signed and Sealed this
Seventh Day of June, 2016

Michelle K. Lee
*Director of the United States Patent and Trademark Office*